(12) United States Patent
Bartel et al.

(10) Patent No.: US 9,048,662 B2
(45) Date of Patent: Jun. 2, 2015

(54) DC POWER SURGE PROTECTOR

(71) Applicant: Transtector Systems, Inc., Hayden, ID (US)

(72) Inventors: Karl C. Bartel, Gardnerville, NV (US); Russell Swart, Coeur d' Alene, ID (US)

(73) Assignee: Transtector Systems, Inc., Hayden, ID (US)

( * ) Notice: Subject to any disclaimer, the term of this patent is extended or adjusted under 35 U.S.C. 154(b) by 102 days.

(21) Appl. No.: 13/842,373

(22) Filed: Mar. 15, 2013

(65) Prior Publication Data

US 2013/0242443 A1    Sep. 19, 2013

Related U.S. Application Data

(60) Provisional application No. 61/612,876, filed on Mar. 19, 2012.

(51) Int. Cl.
| H02H 1/00 | (2006.01) |
| H02H 3/20 | (2006.01) |
| H02H 9/04 | (2006.01) |
| H02H 9/06 | (2006.01) |

(52) U.S. Cl.
CPC .............. *H02H 3/202* (2013.01); *H02H 9/042* (2013.01); *H02H 9/06* (2013.01)

(58) Field of Classification Search
USPC .................................................. 361/117–120
See application file for complete search history.

(56) References Cited

U.S. PATENT DOCUMENTS

| 2,030,179 | A | 2/1936 | Potter |
| 3,167,729 | A | 1/1965 | Hall |
| 3,323,083 | A | 5/1967 | Ziegler |
| 3,619,721 | A | 11/1971 | Westendorp |
| 3,663,901 | A | 5/1972 | Forney, Jr. |
| 3,731,234 | A | 5/1973 | Collins |
| 3,750,053 | A | 7/1973 | LeDonne |
| 3,783,178 | A | 1/1974 | Philibert |
| 3,831,110 | A | 8/1974 | Eastman |
| 3,832,627 | A | 8/1974 | Ohsawa |
| 3,845,358 | A | 10/1974 | Anderson et al. |
| 3,944,937 | A | 3/1976 | Fujisawa et al. |
| 3,956,717 | A | 5/1976 | Fisher et al. |
| 3,980,976 | A | 9/1976 | Tadama et al. |
| 4,021,759 | A | 5/1977 | Campi |

(Continued)

FOREIGN PATENT DOCUMENTS

| CH | 675933 | 11/1990 |
| JP | 08-066037 | 3/1996 |

(Continued)

*Primary Examiner* — Danny Nguyen
(74) *Attorney, Agent, or Firm* — Snell & Wilmer LLP

(57) ABSTRACT

A DC surge protection circuit for protecting hardware from surges. During operation when no surge condition is present, the circuit passes signals from an input to an output through an inductance. When a surge is present, the circuit conducts a portion of the surge through at least one diode and diverts the surge to a ground node. A gas tube begins to conduct a portion of the surge above a first voltage level after the at least one diode first begins to conduct. A first MOV begins to conduct a portion of the surge above a second voltage level after the gas tube begins to conduct. The circuit may include a status portion. The circuit may be within an enclosure for plug-in to a motherboard or within an enclosure of an in-line connector for connection with a cable. The circuit may be configured to attach directly to a frame.

14 Claims, 12 Drawing Sheets

(56) References Cited

U.S. PATENT DOCUMENTS

| | | |
|---|---|---|
| 4,046,451 A | 9/1977 | Juds et al. |
| 4,047,120 A | 9/1977 | Lord et al. |
| 4,112,395 A | 9/1978 | Seward |
| 4,262,317 A | 4/1981 | Baumbach |
| 4,356,360 A | 10/1982 | Volz |
| 4,359,764 A | 11/1982 | Block |
| 4,384,331 A | 5/1983 | Fukuhara et al. |
| 4,409,637 A | 10/1983 | Block |
| 4,481,641 A | 11/1984 | Gable et al. |
| 4,554,608 A | 11/1985 | Block |
| 4,563,720 A | 1/1986 | Clark |
| 4,586,104 A | 4/1986 | Standler |
| 4,689,713 A | 8/1987 | Hourtane et al. |
| 4,698,721 A | 10/1987 | Warren |
| 4,727,350 A | 2/1988 | Ohkubo |
| 4,901,183 A * | 2/1990 | Lee .................................. 361/56 |
| 4,952,173 A | 8/1990 | Peronnet et al. |
| 4,984,146 A | 1/1991 | Black et al. |
| 4,985,800 A | 1/1991 | Feldman et al. |
| 5,053,910 A | 10/1991 | Goldstein |
| 5,057,964 A | 10/1991 | Bender et al. |
| 5,102,818 A | 4/1992 | Paschke et al. |
| 5,122,921 A | 6/1992 | Koss |
| 5,124,873 A | 6/1992 | Wheeler |
| 5,142,429 A | 8/1992 | Jaki |
| 5,166,855 A | 11/1992 | Turner |
| 5,170,151 A | 12/1992 | Hochstein |
| 5,278,720 A | 1/1994 | Bird |
| 5,321,573 A | 6/1994 | Persona et al. |
| 5,353,189 A | 10/1994 | Tomlinson |
| 5,412,526 A | 5/1995 | Kapp et al. |
| 5,442,330 A | 8/1995 | Fuller et al. |
| 5,534,768 A | 7/1996 | Chavannes et al. |
| 5,537,044 A | 7/1996 | Stahl |
| 5,611,224 A | 3/1997 | Weinerman et al. |
| 5,617,284 A | 4/1997 | Paradise |
| 5,625,521 A | 4/1997 | Luu |
| 5,667,298 A | 9/1997 | Musil et al. |
| 5,721,662 A | 2/1998 | Glaser et al. |
| 5,781,844 A | 7/1998 | Spriester et al. |
| 5,790,361 A | 8/1998 | Minich |
| 5,798,790 A | 8/1998 | Knox et al. |
| 5,844,766 A | 12/1998 | Miglioli et al. |
| 5,854,730 A | 12/1998 | Mitchell et al. |
| 5,953,195 A | 9/1999 | Pagliuca |
| 5,963,407 A | 10/1999 | Fragapane et al. |
| 5,966,283 A | 10/1999 | Glaser et al. |
| 5,982,602 A | 11/1999 | Tellas et al. |
| 5,986,869 A | 11/1999 | Akdag |
| 6,031,705 A | 2/2000 | Gscheidle |
| 6,054,905 A | 4/2000 | Gresko |
| 6,060,182 A | 5/2000 | Tanaka et al. |
| 6,061,223 A | 5/2000 | Jones et al. |
| 6,086,544 A | 7/2000 | Hibner et al. |
| 6,115,227 A | 9/2000 | Jones et al. |
| 6,137,352 A | 10/2000 | Germann |
| 6,141,194 A | 10/2000 | Maier |
| 6,177,849 B1 | 1/2001 | Barsellotti et al. |
| 6,226,166 B1 | 5/2001 | Gumley et al. |
| 6,236,551 B1 | 5/2001 | Jones et al. |
| 6,243,247 B1 | 6/2001 | Akdag et al. |
| 6,252,755 B1 | 6/2001 | Willer |
| 6,281,690 B1 | 8/2001 | Frey |
| 6,292,344 B1 | 9/2001 | Glaser et al. |
| 6,342,998 B1 | 1/2002 | Bencivenga et al. |
| 6,381,283 B1 | 4/2002 | Bhardwaj et al. |
| 6,385,030 B1 | 5/2002 | Beene |
| 6,394,122 B1 | 5/2002 | Sibley et al. |
| 6,421,220 B2 | 7/2002 | Kobsa |
| 6,502,599 B1 | 1/2003 | Sibley et al. |
| 6,527,004 B1 | 3/2003 | Sibley et al. |
| 6,535,369 B1 | 3/2003 | Redding et al. |
| 6,650,203 B2 | 11/2003 | Gerstenberg et al. |
| 6,721,155 B2 | 4/2004 | Ryman |
| 6,754,060 B2 | 6/2004 | Kauffman |
| 6,757,152 B2 | 6/2004 | Galvagni et al. |
| 6,782,329 B2 | 8/2004 | Scott |
| 6,785,110 B2 | 8/2004 | Bartel et al. |
| 6,789,560 B1 | 9/2004 | Stoner et al. |
| 6,814,100 B1 | 11/2004 | Sibley et al. |
| 6,816,348 B2 | 11/2004 | Chen et al. |
| 6,968,852 B1 | 11/2005 | Sibley |
| 6,975,496 B2 | 12/2005 | Jones et al. |
| 7,082,022 B2 | 7/2006 | Bishop |
| 7,092,230 B2 | 8/2006 | Inauen |
| 7,104,282 B2 | 9/2006 | Hooker et al. |
| 7,106,572 B1 | 9/2006 | Girard |
| 7,130,103 B2 | 10/2006 | Murata |
| 7,159,236 B2 | 1/2007 | Abe et al. |
| 7,221,550 B2 | 5/2007 | Chang et al. |
| 7,250,829 B2 | 7/2007 | Namura |
| 7,338,547 B2 | 3/2008 | Johnson et al. |
| 7,371,970 B2 | 5/2008 | Flammer et al. |
| 7,430,103 B2 | 9/2008 | Kato |
| 7,453,268 B2 | 11/2008 | Lin |
| 7,471,172 B2 | 12/2008 | Holst et al. |
| 7,507,105 B1 | 3/2009 | Peters et al. |
| 7,623,332 B2 | 11/2009 | Frank et al. |
| 7,675,726 B2 | 3/2010 | Bolz et al. |
| 7,808,752 B2 | 10/2010 | Richiuso et al. |
| 7,817,398 B1 | 10/2010 | Maples |
| 2002/0167302 A1 | 11/2002 | Gallavan |
| 2002/0191360 A1 | 12/2002 | Colombo et al. |
| 2003/0072121 A1 | 4/2003 | Bartel et al. |
| 2003/0151870 A1 | 8/2003 | Gronbach et al. |
| 2003/0179533 A1 | 9/2003 | Jones et al. |
| 2003/0211782 A1 | 11/2003 | Esparaz et al. |
| 2004/0042149 A1 | 3/2004 | Devine et al. |
| 2004/0121648 A1 | 6/2004 | Voros |
| 2004/0145849 A1 | 7/2004 | Chang et al. |
| 2004/0264087 A1 | 12/2004 | Bishop |
| 2005/0036262 A1 | 2/2005 | Siebenthall et al. |
| 2005/0044858 A1 | 3/2005 | Hooker et al. |
| 2005/0176275 A1 | 8/2005 | Hoopes et al. |
| 2005/0185354 A1 | 8/2005 | Hoopes |
| 2005/0206482 A1 | 9/2005 | Du Toit et al. |
| 2006/0038635 A1 | 2/2006 | Richiuso et al. |
| 2006/0044076 A1* | 3/2006 | Law .............................. 333/124 |
| 2006/0082946 A1* | 4/2006 | Duenez et al. ................ 361/111 |
| 2006/0120005 A1 | 6/2006 | Van Sickle |
| 2006/0139832 A1 | 6/2006 | Yates et al. |
| 2006/0146458 A1 | 7/2006 | Mueller |
| 2007/0053130 A1 | 3/2007 | Harwath |
| 2007/0095400 A1 | 5/2007 | Bergquist et al. |
| 2007/0097583 A1 | 5/2007 | Harwath |
| 2007/0139850 A1 | 6/2007 | Kamel et al. |
| 2008/0170346 A1 | 7/2008 | Van Swearingen |
| 2009/0103226 A1 | 4/2009 | Penwell et al. |
| 2009/0109584 A1 | 4/2009 | Jones et al. |
| 2009/0284888 A1 | 11/2009 | Bartel et al. |
| 2009/0296430 A1 | 12/2009 | Rieux-Lopez et al. |
| 2011/0080683 A1 | 4/2011 | Jones et al. |
| 2011/0141646 A1 | 6/2011 | Jones et al. |
| 2011/0159727 A1 | 6/2011 | Howard et al. |
| 2011/0279943 A1* | 11/2011 | Penwell et al. ............... 361/118 |

FOREIGN PATENT DOCUMENTS

| | | |
|---|---|---|
| JP | 11-037400 | 2/1999 |
| JP | 2003-070156 | 3/2003 |
| JP | 2003-111270 | 4/2003 |
| KR | 10-2003-0081041 | 10/2003 |
| KR | 1020090018497 | 2/2009 |
| WO | WO 95/10116 | 4/1995 |
| WO | WO 2011-119723 | 12/2011 |

* cited by examiner

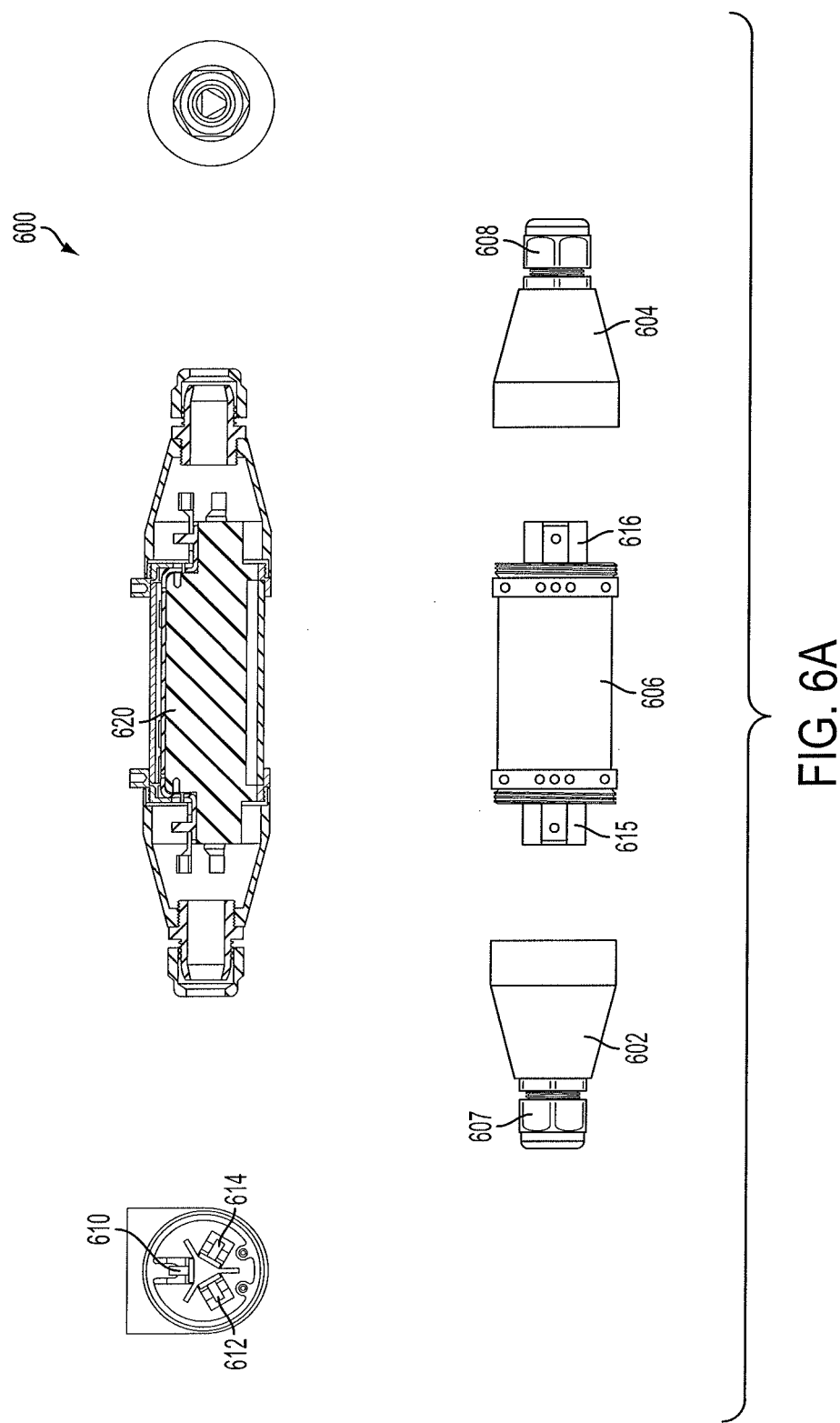

DC POWER SURGE PROTECTOR

CROSS REFERENCE TO RELATED APPLICATIONS

This application claims the benefit and priority of U.S. Provisional Application No. 61/612,876, filed on Mar. 19, 2012, entitled "DC Power Surge Protector," the entire contents of which are hereby incorporated by reference herein.

BACKGROUND

1. Field

The present invention relates generally to surge protection circuits and improvements thereof. More particularly, the present invention relates to DC surge protection circuits and their incorporation into plug-in or frame mountable devices and improvements thereof.

2. Description of the Related Art

Communications equipment, computers, home stereo amplifiers, televisions and other electronic devices are increasingly manufactured using a variety of electronic components that are vulnerable to damage from electrical energy surges. Surge variations in power and transmission line voltages, as well as noise, can severely damage or destroy electronic devices along their propagation path. Electronic devices impacted by these surge conditions can be very expensive to repair or replace. Therefore, a cost effective way to protect these devices and components from power surges is needed.

Surge protectors help defend electronic equipment from damage due to the large variations in the current and voltage resulting from lightning strikes, switching surges, transients, noise, incorrect connections or other abnormal conditions or malfunctions that travel across power or transmission lines. As the number of electronic systems and equipment increase through both commercial and industrial society, the need for adequate and efficient protection from power surges becomes ever more important. A malfunctioning system or piece of equipment due to an unexpected or unintended surge of electrical power runs the risk of extensive monetary damage to the system or equipment and can even impact human safety. In an effort to reduce these risks, protection circuits or devices have been incorporated as part of or connectible to electrical systems or equipment in order to prevent the propagation of power surges through the electronics or other electrical equipment.

DC circuit protection has been afforded via a variety of circuit elements such as silicon avalanche diodes (SADs), metal oxide varistors (MOVs), Gas Tubes (GDTs) and other non-linear circuit components. When surge energy above a predetermined threshold encounters one of these components, the surge may be diverted from a signal line that is connected to the protected electrical equipment. However, conventional protection circuits can be extremely costly as the power dissipation requirements for a given system increase. The interaction of the various circuit elements may not efficiently mitigate the surge energy and therefore require a purchaser of such circuit protection to pay an inordinately higher cost for higher rated components than would otherwise be necessary. Particularly for applications at risk of high surge energy input, prior art DC protection circuits can easily become prohibitively expensive.

Therefore, a DC surge protection system or circuit is desirable that can more efficiently maintain an output voltage below a certain voltage threshold, even during the onset of a high energy surge condition. The DC surge protection system or circuit would ideally be low cost and utilize a configuration of electrical components capable of dissipating high levels of surge energy while utilizing inexpensive circuit elements. Moreover, the DC surge protection system or circuit would desirably be capable of easy scalability to a variety of desired output voltage levels or surge protection or suppression capabilities. In addition, the DC surge protection system or circuit would desirably be capable of incorporation into a variety of connectible enclosures or devices for interfacing with a user's particular system of setup.

SUMMARY

An apparatus and method for protecting connected systems or equipment from a DC power surge is disclosed. In one embodiment, a DC surge protection circuit may include a power input node for receiving an input signal, a first inductor electrically connected to the input node for permitting a non-surge signal to flow substantially unimpeded from the power input node, a power output node electrically connected to the first inductor for receiving the non-surge signal, at least one diode electrically connected between the power output node and a ground node for diverting at least a portion of a surge signal to the ground node, and a first metal oxide varistor electrically connected between the power input node and the ground node and in parallel with the at least one diode for diverting at least a portion of the surge signal to the ground node, the first metal oxide varistor diverting the at least the portion of the surge signal after the at least one diode diverts at least a portion of the surge signal In another embodiment, a DC surge protection circuit may include a power input node for receiving an input signal, the input signal being either a surge signal or a non-surge signal; a power output node for outputting the non-surge signal; a first inductor electrically connected to the input node and the output node for permitting the non-surge signal to flow substantially unimpeded from the power input node to the power output node; at least one diode electrically connected between the power output node and a ground node for diverting at least a first portion of the surge signal to the ground node; and a first metal oxide varistor electrically connected between the power input node and the ground node and in parallel with the at least one diode, the first metal oxide varistor being configured to divert at least a second portion of the surge signal after the at least one diode diverts the at least the first portion of the surge signal.

In yet another embodiment, a DC surge protection circuit may include a power input node for receiving an input signal, the input signal being either a surge signal or a non-surge signal; a power output node electrically for outputting the non-surge signal; at least one inductor electrically connected to the input node and the output node for permitting a non-surge signal to flow substantially unimpeded from the power input node to the power output node; at least one diode electrically connected between the power output node and a ground node, the at least one diode being configured to divert at least a first portion of the surge signal to the ground node; and a surge protection switch electrically connected between the at least one diode and the ground node.

In yet another embodiment, a DC surge protection circuit may include a power input node for receiving an input signal, the input signal being either a surge signal or a non-surge signal; a power output node for outputting the non-surge signal; a cable protector including a first end portion, a second end portion and a middle portion between the first end portion and the second end portion, the middle portion having a cavity therein; a first inductor positioned within the cavity and electrically connected to the input node and the output node for permitting a non-surge signal to flow substantially unimpeded from the power input node to the power output node; at least one diode positioned within the cavity and electrically connected between the power output node and a ground node for diverting at least a first portion of a surge signal to the ground node; and a first metal oxide varistor positioned within the cavity and electrically connected between the power input node and the ground node and in parallel with the at least one diode, wherein the first metal oxide varistor diverts at least a second portion of the surge signal to the ground node after the at least one diode diverts the at least the first portion of the surge signal.

BRIEF DESCRIPTION OF THE DRAWINGS

Other systems, methods, features, and advantages of the present invention will be or will become apparent to one with skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

FIG. 6A is a plurality of views of a circular in-line cable protector for providing DC surge protection according to an embodiment of the invention;

DETAILED DESCRIPTION

Figure 1A:
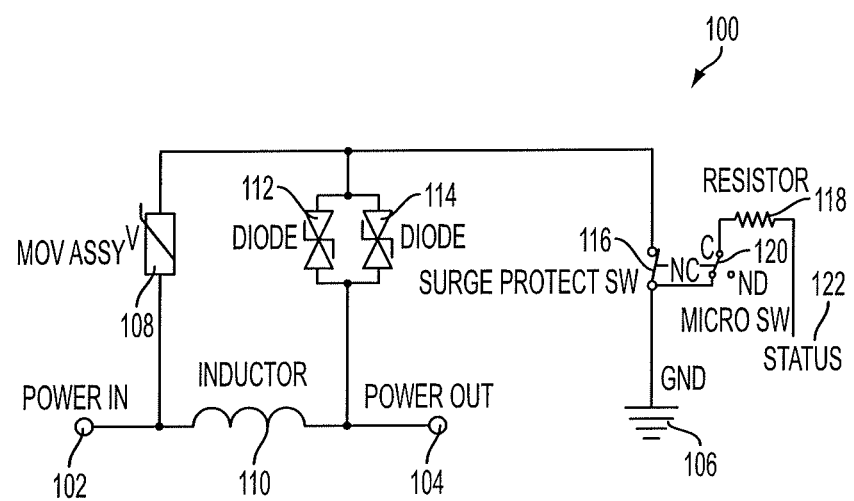
FIG. 1A is a schematic circuit diagram of a DC surge protection circuit utilizing a first metal oxide varistor ("MOV"), a surge protection switch, and bi-directional diodes for maintaining an output voltage below a predetermined threshold according to an embodiment of the invention.

Referring to FIG. 1A, a schematic circuit diagram of a DC surge protection circuit 100 is shown for maintaining an output voltage below a predetermined threshold. The DC surge protection circuit 100 operates to protect any connected electrical equipment from an electrical surge that could otherwise damage or destroy the electrical equipment. The electrical equipment can be any form of electric or electronic device, for example communications equipment, cell towers, base stations, PC computers, servers, network components or equipment, network connectors or any other type of surge sensitive system. The DC surge protection circuit 100 includes a number of different electrical components, such as metal oxide varistors ("MOVs"), inductors, diodes and resistors. For illustrative purposes, the DC surge protection circuit 100 will be described with reference to specific MOV, inductor, diode or resistor values or configurations in order to achieve specific DC surge protection or status notification capabilities. However, other MOV, inductor, diode or resistor values or configurations may be used to achieve alternative surge protection or status notification characteristics. Although the embodiment is shown with particular MOV, inductor, diode or resistor circuit elements, it is not required that the exact circuit elements described be used in the present invention. Thus, the first MOV, the second MOV, the inductor, the one or more diodes or the resistor are merely used to illustrate an embodiment of the invention and not to limit the present invention.

The DC surge protection circuit 100 may be implemented as part of a surge protection or suppression device, such as a plug-in apparatus, a frame-mountable apparatus or as part of an in-line connector, as described in greater detail herein. The DC surge protection circuit 100 may be implemented in any manner such that it electrically connects with electrical equipment to protect the electrical equipment from undesirable surge energy levels. The DC surge protection circuit 100 includes a power input node 102 and a power output node 104 for connecting the DC surge protection circuit 100 between a DC voltage source and electrical equipment or system to be protected. In one embodiment, the DC surge protection circuit 100 may be configured to receive or connect to a +/−48 Vdc voltage source. In another embodiment, the DC surge protection circuit 100 may be configured to receive or connect to a +/−60 Vdc voltage source. In still another embodiment, the DC surge protection circuit 100 may be configured to receive or connect to a +/−75 Vdc voltage source. Moreover, the DC surge protection circuit 100 may alternatively be utilized with AC power applications having voltage levels corresponding to various RMS values for their power source waveforms. As described in greater detail herein, one or more of the circuit components (e.g., diodes) may be selected so as to configure the DC surge protection circuit 100 for a desired DC input voltage source.

The power input node 102 and the power output node 104 are configured to mate or otherwise interface with other signal carrying conductors, for example, traces on an electrical board such as a motherboard, conductive surfaces on a frame or signal carrying conductors in a cable, as discussed in greater detail herein. By electrically connecting the DC surge protection circuit 100 along a conductive path or transmission line between a power source and electrical equipment to be protected, an electrical surge introduced along the conductive path or transmission line that could otherwise damage or destroy the electrical equipment will instead be dissipated through the DC surge protection circuit 100 to a ground node 106. Thus, a voltage level at the power output node 104 can be maintained below a desired or predetermined maximum voltage or threshold level (e.g., 100 Vdc).

The DC surge protection circuit 100 includes various circuit elements coupled between the power input node 102, the power output node 104 and the ground node 106. During normal operation, when no surge condition is present at the power input node 102, DC signals are permitted to flow substantially unimpeded to the power output node 104 via an inductor 110 that acts substantially like a short circuit. The inductor 110 may be any type of inductor, for example a power inline inductor that is toroidal and helical wound. Furthermore, the inductor may have any of a variety of inductance values (e.g., 3 μH-33 μH) or resistance values (e.g., 3 mΩ-6 mΩ).

However, when a surge condition is present at the power input node 102, additional circuit elements begin to conduct the surge at various turn-on voltages in order to prevent the surge from propagating through the power output node 104 and interfering with the electrical equipment connected thereto. Turning more specifically to these additional circuit elements, a plurality of diodes (112, 114) are connected in parallel with one another between the power output node 104 and the ground node 106. Each of the diodes (112, 114) are selected so to have a predetermined turn-on voltage, for example, within 15% of the normal, non-surge DC voltage input on the power input node 102 (e.g., 55 Vdc turn-on for 48 Vdc input voltage, 68 Vdc turn-on for 60 Vdc input voltage, 86 Vdc turn-on for 75 Vdc input voltage, etc). Thus, during normal operation, minimal voltage is dropped across the diodes (112, 114) and substantially all the signal voltage is seen at the power output node 104. However, upon a surge condition of sufficient voltage, the diodes (112, 114) turn-on and operate to help maintain an output voltage at the power output node 104 below a predetermined maximum voltage or threshold level.

The diodes (112, 114) are bi-directional, and thus the DC surge protection circuit 100 may be connected to either positive polarity or negative polarity voltage sources. In an alternative embodiment, if only a single voltage input source polarity is desired for a given application, uni-directional diodes may be utilized instead of bi-directional diodes. The diodes (112, 114) may have a very high current conducting capability (e.g., 1000 A each) in order to accommodate the large surge currents that may be propagated through the diodes (112, 114) during certain surge conditions. Depending upon the surge waveform characteristics or requirements, additional diodes may be connected in parallel with the diodes (112, 114) to ensure adequate surge protection. For example, a surge waveform having an 8 μs rise time to 90% surge level and 20 μs fall time to 50% surge level may only require the two diodes (112, 114) as shown. For surge waveforms of longer duration and/or of higher energy, for example, 10 μs rise time to 90% surge level and 250 μs fall time to 50% surge level, additional diodes may be needed. Certain embodiments may only require one diode be utilized.

The DC surge protection circuit 100 also includes a first MOV 108 coupled between the power input node 102 and the ground node 106 for dissipating higher levels of surge voltage. In one embodiment, the first MOV 108 may have a turn-on voltage of roughly 100 volts and may be capable of withstanding a surge condition of 30-40 kA. Once the surge condition surpasses the turn-on voltage of the first MOV 108, the first MOV 108 begins to conduct the surge energy to the ground node 106. Thus, a voltage divider is formed via the inductor 110 and the diodes (112, 114) for maintaining an output voltage at the power output node 104 below the predetermined maximum voltage or threshold level. The inductor 110 drops a voltage in accordance with the equation:

$$V = L * (\delta i / \delta i)$$

Thus, as surge levels increase to conduct through the first MOV 108, an ever lower voltage above the nominal input voltage source is witnessed at the power output node 104 due to the voltage drop across the inductor 110 instead of relying exclusively on the turn-on of the diodes (112, 114). For example, the first MOV 108 diverts at least a second portion of the surge signal after the diodes (112, 114) divert at least a first portion of the surge signal.

The DC surge protection circuit 100 also includes a status notification portion for alerting a user or other system when one or more of the various circuit elements for dissipating a surge condition has failed. A surge protection switch 116 is connected in series between the ground node 106 and the first MOV 108 or diodes (112, 114). The surge protection switch 116 is normally held in the closed position via a solder connection such that surge signals propagate through the surge protection switch 116 on their way to the ground node 106. During operation when the first MOV 108 and the diodes (112, 114) have not failed, the solder maintains the surge protection switch 116 in the closed position. However, if the first MOV 108 or one or both of the diodes (112, 114) have failed such that a short is created to the ground node 106, the high current levels through the surge protection switch 116 melt or otherwise break the solder connection. Upon removal of the solder connection for maintaining the surge protection switch 116 in the closed position, the surge protection switch 116 opens (e.g., via a spring bias), thus removing the ground node 106 from the first MOV 108 and the diodes (112, 114). In this configuration, the DC surge protection circuit 100 no longer operates to dissipate a surge condition that may be input at the power input node 102.

Upon the opening of the surge protection switch 116, an auxiliary switch 120 is changed from a closed position connected to the ground node 106 to an open position due to the movement of the surge protection switch 116. In other words, a current state (e.g., of either an open state or a closed state) of the auxiliary switch 120 may be based on a current state (e.g., of either an open state or a closed state) of the surge protection switch 116.

Thus, status circuitry (e.g., an LED or other lamp) may be connected through a limiting resistor 118 to the ground node 106. The LED or other lamp may be illuminated when the DC surge protection circuit 100 does not have any failed circuit elements. However, upon the opening of the auxiliary switch 120, the LED or other lamp turns off or otherwise provides a notification to indicate a failure has occurred and that replacement or repair of the DC surge protection circuit 100 is required. In an alternative embodiment, any of a number of circuit configurations or components may be utilized for alerting or otherwise notifying a user or a connected system that one or more components of the DC surge protection circuit 100 are in need of servicing or replacement for proper operation to continue.

Figure 1B:
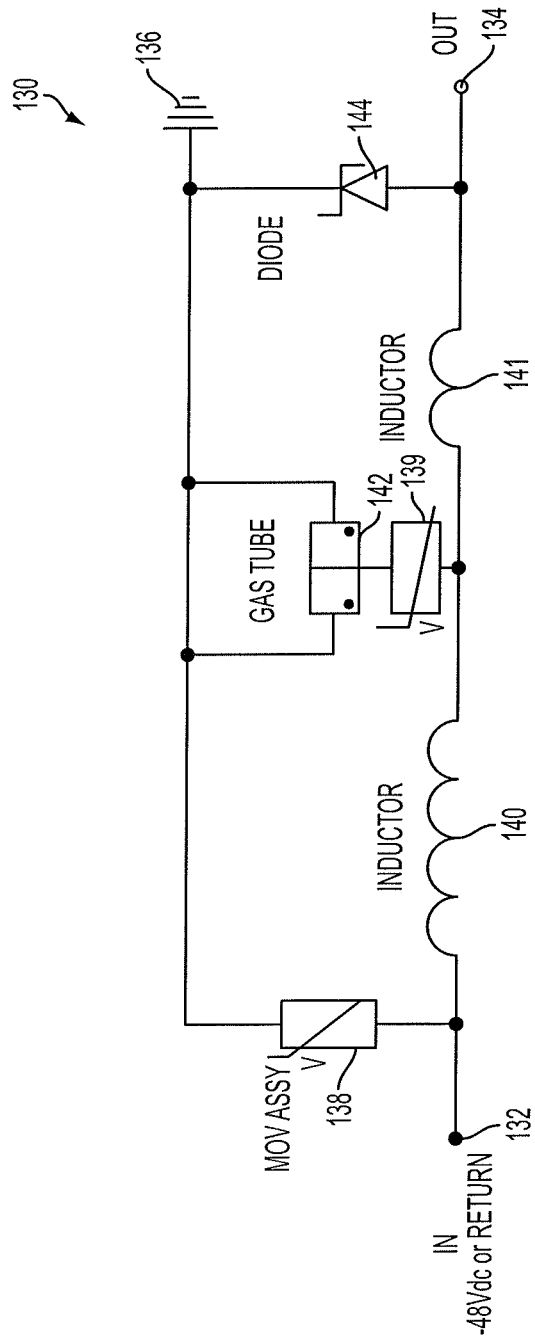
FIG. 1B is a schematic circuit diagram of a DC surge protection circuit utilizing a first MOV, a second MOV, a gas tube, and a uni-directional diode for maintaining an output voltage below a predetermined threshold according to an embodiment of the invention.

Turning next to FIG. 1B, a schematic circuit diagram of a DC surge protection circuit 130 for maintaining an output voltage below a predetermined threshold is shown. The DC surge protection circuit 130 may be implemented as part of a surge protection or suppression device, such as a plug-in apparatus, a frame-mountable apparatus or as part of an in-line connector, as described in greater detail herein. Generally, the DC surge protection circuit 130 may include certain structural, operational or functional features that are the same or similar to those of the DC surge protection circuit 100 previously described for FIG. 1A. Notwithstanding these features, the DC surge protection circuit 130 may be distinguished primarily on the inclusion of a second inductor 141 and a gas tube 142.

Similar to the DC surge protection circuit 100, the DC surge protection circuit 130 includes a power input node 132 and a power output node 134. A first inductor 140 is connected to the power input node 132 and a second inductor 141 is connected to the power output node 134. The first inductor 140 is connected to the second inductor 141 to form an intermediate node between the first inductor 140 and the second inductor 141 such that, during normal operation, a DC signal present on the power input node 132 is permitted to flow substantially unimpeded through the first inductor 140 and the second inductor 141 to the power output node 134. In one embodiment, the first inductor 140 may have an inductance of 18 µH and the second inductor 141 may have an inductance of 3 µH.

The DC surge protection circuit 130 also includes various circuit elements coupled between the power input node 132, the power output node 134 and a ground node 136, similar to the DC surge protection circuit 100 previously described. Thus, upon a surge condition present at the power input node 132, one or more of the various circuit elements operate to dissipate the surge to the ground node 136 in order to maintain an output voltage level at the power output node 134 below a predetermined voltage threshold. A diode 144 is connected between the power output node 134 and the ground node 136 and operates the same or similar to the diodes (112, 114) of the DC surge protection circuit 100. The diode 144 a uni-directional diode such that the DC surge protection circuit 130 may be utilized for a power input source of a single polarity.

However, unlike the DC surge protection circuit 100, the DC surge protection circuit 130 includes a gas tube 142 for conducting surge energy to the ground node 136 instead of relying solely upon the diode 144 before the surge voltage is high enough to turn on a first MOV 138. In one embodiment, the gas tube 142 may be a pair of 90V gas tubes in parallel (i.e., 180V end-to-end). During a surge event, the diode 144 initially begins to conduct first. Once the surge voltage overtakes the turn-on voltage of the gas tube 142, the gas tube 142 next begins to conduct. The second inductor 141 and the diode 144 thus form a voltage divider circuit for the voltage dropped across the gas tube 142. Once the surge voltage overtakes the turn-on voltage of the first MOV 138, the first MOV 138 next begins to conduct. At this time, the first inductor 140, the second inductor 141 and the diode 144 form a voltage divider circuit for the voltage dropped across the first MOV 138. Utilizing the gas tube 142 in the DC surge protection circuit 130 instead of merely a parallel connection of diodes (see FIG. 1A), a lower rated diode 144 may be used since the diode 144 need not have as high a current rating due to the additional voltage drop across the second inductor 141. In one embodiment, as shown in FIG. 1B, a second MOV 139 is connected in series with the gas tube 142 such that the second MOV 139 is connected to the intermediate node between the first inductor 140 and the second inductor 141. The second MOV 139 may, for example, shut down the gas tube 142 after the power input node 132 receives the surge signal or after the surge event when DC power is applied to the DC surge protection circuit 130. In another embodiment, the gas tube 142 is directly connected to the intermediate node between the first inductor 140 and the second inductor 141.

Other aspects, features or operation of the DC surge protection circuit 130 may be the same or similar to those of the DC surge protection circuit 100. Although no status notification portion is shown in the DC surge protection circuit 130, such circuitry may be included, the same or similar to the previous description for the DC surge protection circuit 100 of FIG. 1A.

Figure 1C:
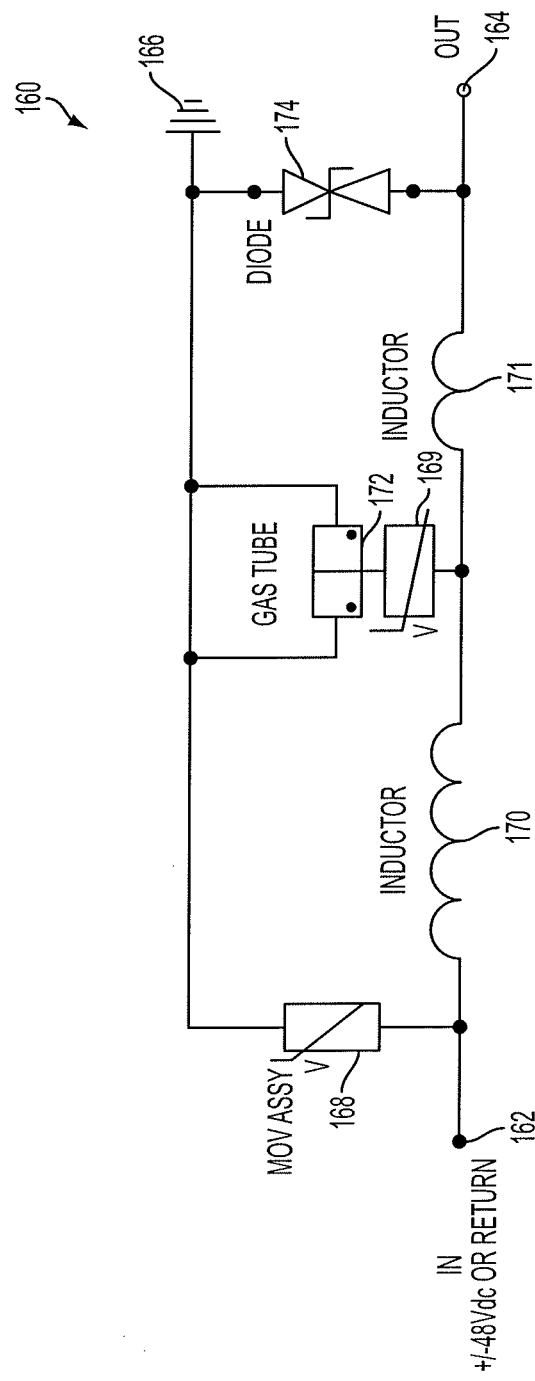
FIG. 1C is a schematic circuit diagram of a DC surge protection circuit utilizing a first MOV, a second MOV, a gas tube, and a bi-directional diode for maintaining an output voltage below a predetermined threshold according to an embodiment of the invention.

FIG. 1C shows a schematic circuit diagram of a DC surge protection circuit 160 for maintaining an output voltage below a predetermined threshold. The DC surge protection circuit 160 may be implemented as part of a surge protection or suppression device, such as a plug-in apparatus, a frame-mountable apparatus or as part of an in-line connector, as described in greater detail herein. Generally, the DC surge protection circuit 160 may include certain structural, operational or functional features that are the same or similar to those of the DC surge protection circuit 130 previously described for FIG. 1B or the DC surge protection circuit 100 previously described for FIG. 1A. Notwithstanding these features, the DC surge protection circuit 160 may be distinguished from the DC surge protection circuit 130 of FIG. 1B primarily on the inclusion of a bi-directional diode 174 in place of a uni-directional diode 144.

The DC surge protection circuit 160 includes a power input node 162, a power output node 164, a first inductor 170 connected to the power input node 162 and a second inductor 171 connected to the power output node 164, the same or similar to the DC surge protection circuit 130 previously described. A voltage source of either polarity (i.e. positive or negative DC voltage) may be connected to the power input node 162. The first inductor 170 is connected to the second inductor 171 such that, during normal operation, a DC signal present on the power input node 162 is permitted to flow substantially unimpeded through the first inductor 170 and the second inductor 171 to the power output node 164, the same or similar to the DC surge protection circuit 130.

The DC surge protection circuit 160 also includes various circuit elements coupled between the power input node 162, the power output node 164 and a ground node 166, the same or similar to the DC surge protection circuit 130 and includes a first MOV 168, a gas tube 172 and a diode 174. While the DC surge protection circuit 130 operated for a single polarity input voltage source due to the utilization of the uni-directional diode 144, the use of the bi-directional diode 174 in the DC surge protection circuit 160 allows the power input node 162 to receive a power source of either polarity. The DC surge protection circuit 160 operates the same or similar to the DC surge protection circuit 130 upon the presence of a surge condition at the power input node 162 by dissipating the surge through one or more of the first MOV 168, the gas tube 172 and/or the diode 174 to the ground node 166.

In one embodiment, as shown in FIG. 1C, a second MOV 169 is connected in series with the gas tube 172 such that the second MOV 169 is connected to the intermediate node between the first inductor 170 and the second inductor 171. The second MOV 169 may, for example, shut down the gas tube 172 after the power input node 162 receives the surge signal or after the surge event when DC power is applied to the DC surge protection circuit 160. In another embodiment, the gas tube 172 is directly connected to the intermediate node between the first inductor 170 and the second inductor 171.

Figure 1D:
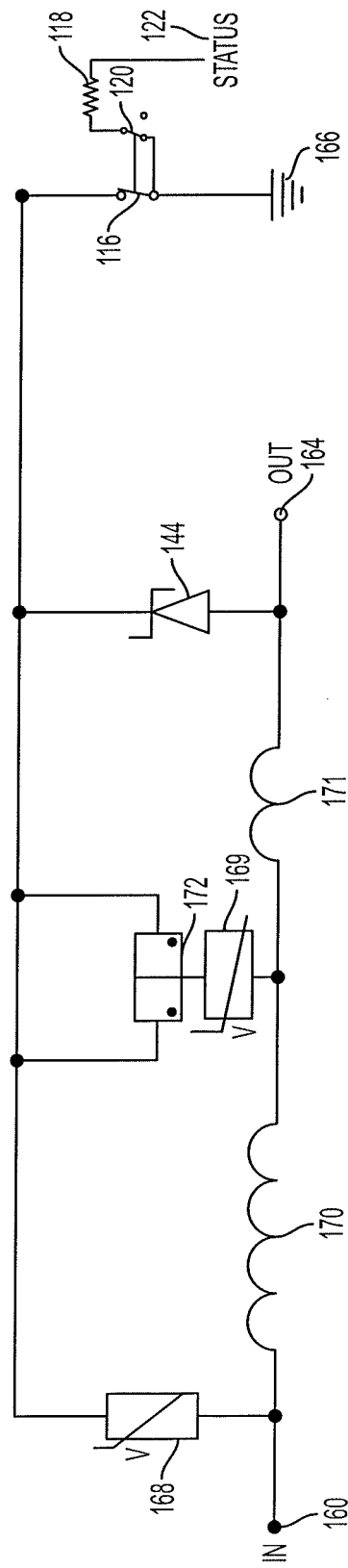
FIG. 1D is a schematic circuit diagram of a DC surge protection circuit utilizing a first MOV, a second MOV, a gas tube, a surge protection switch, and at least one diode for maintaining an output voltage below a predetermined threshold according to an embodiment of the invention.

The DC surge protection circuits 100, 130 or 160 are described for illustration purposes. The DC surge protection circuits 100, 130 or 160 described above for FIGS. 1A-1C may be modified or alternatively designed with different circuit element values or with different, additional, or fewer circuit elements to achieve the same or similar functionality. The DC surge protection circuits 100, 130 or 160 may be modified to utilize some or all of the electronic devices of the DC surge protection circuits 100, 130 or 160 described above in various other configurations without limiting the scope of the present invention. For example, as shown in FIG. 1D, the DC surge protection circuit 130 or 160 may be modified to include the status notification portion described above with respect to the DC surge protection circuit 100. Furthermore, for example, a second MOV 169 is connected in series with the gas tube 172 such that the second MOV 169 is connected to the intermediate node between the first inductor 170 and the second inductor 171. The second MOV 169 may, for example, shut down the gas tube 172 after the power input node 162 receives the surge signal or after the surge event when DC power is applied to the DC surge protection circuit 190. In another embodiment, the gas tube 172 is directly connected to the intermediate node between the first inductor 170 and the second inductor 171. In another embodiment, for example, in the DC surge protection circuit 190 of FIG. 1D, the uni-directional diode 144 may instead be the bi-directional diode 174.

The DC surge protection circuits 100, 130, 160 or 190 may also be scaled for application of any desired voltage or current operating levels. As such, the DC surge protection circuits 100, 130, 160 or 190 may be configured for typical ranges or commonly expected surge levels or may be designed and constructed as a custom configuration to meet requirements of a particular system or setup. In addition, the circuit elements incorporating the DC surge protection circuits 100, 130, 160 or 190 may be discrete elements positioned within or to an enclosure or other housing and/or may be mounted or electrically connected to a printed circuit board for forming a DC surge protection device. Such an enclosure may have input and/or output ports for allowing installation of the device to outside systems or equipment. In certain embodiments, the enclosure may be a connector with various circuit elements integrated within the connector. Examples of such DC surge protection devices will now be described for FIGS. 2A-2C, 3, 4A-4D, 5 and 6A-6C.

Figure 2A:
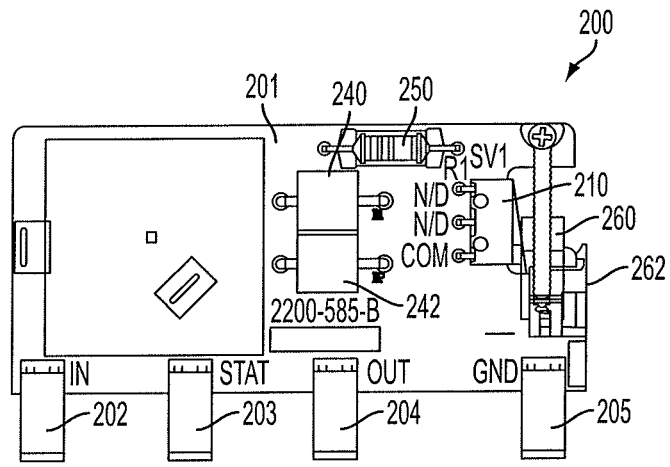
FIG. 2A is a front view of a DC surge protection circuit board configured for plug-in to an electrical board according to an embodiment of the invention.
Figure 2B:
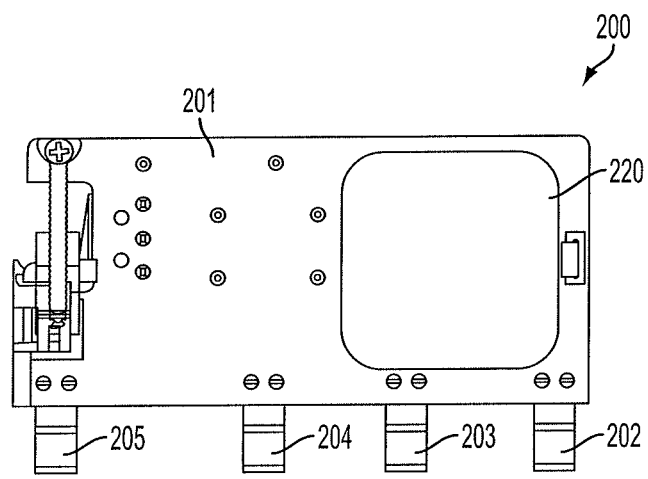
FIG. 2B is a rear view of the DC surge protection circuit board of FIG. 2A configured for plug-in to an electrical board according to an embodiment of the invention.
Figure 2C:
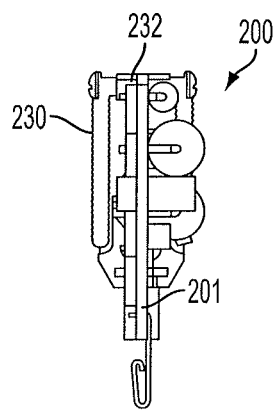
FIG. 2C is a side view of the DC surge protection circuit board of FIG. 2A configured for plug-in to an electrical board according to an embodiment of the invention.

Looking first to FIG. 2A-2C, various views of a DC surge protection circuit board 200 configured for plug-in to an electrical board are shown. FIG. 2A is a front view of the DC surge protection circuit board 200 displaying a plurality of electrical components mounted thereto. A printed circuit board 201 having a front surface and a rear surface provides a unit for mounting of the plurality of electrical components and includes the conductive pathways for their electrical connection to form a DC surge protection circuit. The DC surge protection circuit may be the same or similar to any of the DC surge protection circuits (100, 130, 160, 190) previously described for FIGS. 1A-1D. For example, the DC surge protection circuit may be configured for a nominal operating voltage of 48 Vdc, a maximum continuous operating voltage of 75 Vdc, a nominal surge current of 20 kA (multiple hits), a maximum surge current of 40 kA, a voltage protection level of under 150 V and a response time of under 1 ns.

Electrical conductors (202, 203, 204, 205) are coupled with the front surface of the printed circuit board 201 and provide connection nodes or ports for a user to connect the DC surge protection circuit board 200 to their electrical systems or equipment. The first conductor 202 is an input port, the second conductor 203 is a status node, the third conductor 204 is an output port and the fourth conductor 205 is a ground port. Diodes (240, 242) are mounted to the front surface of the printed circuit board 201 and are electrically connected in parallel with one another to the third conductor 204 and the fourth conductor 205. A resistor 250 (e.g., metal oxide, 10 kΩ, 1 W) and a microswitch 210 are also mounted to the front surface of the printed circuit board 201 for providing a status notification to a user of the DC surge protection circuit board 200, the same or similar as described for FIG. 1A. A contact loop 260 (e.g., a copper element or bridge) forms a conductive pathway between two conductive nodes and is held by solder in a first configuration for contacting the two conductive nodes and providing a pathway to the fourth conductor 205, the same or similar as described for FIG. 1A. The contact loop 260 loops around a guide contact 262, the guide contact 262 operating to direct the force due to a biasing of a spring against the contact loop 260, as discussed in greater detail below for FIG. 2B.

FIG. 2B is a rear view of the DC surge protection circuit board 200. A first MOV 220 is mounted to one side of the rear surface of the printed circuit board 201, near the first conductor 202 that acts as an input port. FIG. 2C is a side view of the DC surge protection circuit board 200 and shows a spring 230 connected to a spring mount 232 that are mounted to the rear surface of the printed circuit board 201. The spring 230 cooperates with the contact loop 260 and the guide contact 262 for exhibiting a force in a particular direction upon the contact loop 260, for example, to bias the contact loop 260 into an open, disconnected configuration. Thus, upon a current level high enough to melt or otherwise break the solder connection, the contact loop 260 is acted on by the spring in a particular direction due to the guide contact 262 to opens a pathway to the fourth conductor 205. Upon a change in the configuration of the contact loop 260, the microswitch 210 also changes configuration for providing a status notification to a user, the same or similar to as described for FIG. 1A.

Figure 3:
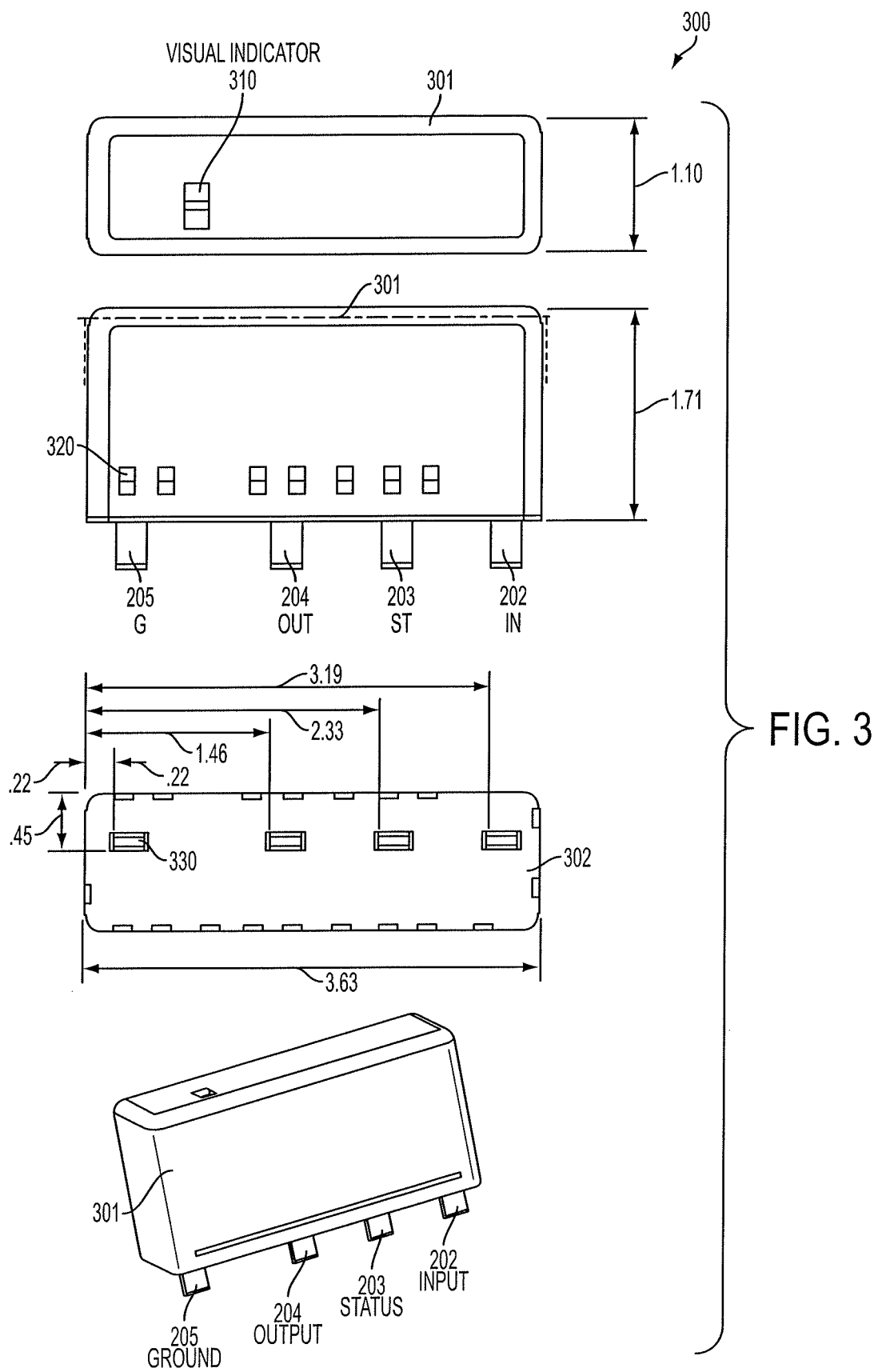
FIG. 3 is a plurality of views of a DC surge protection device including the DC surge protection circuit board of FIG. 2A configured for plug-in to an electrical board according to an embodiment of the invention.

FIG. 3 shows a plurality of views of a DC surge protection device 300 including the DC surge protection circuit board 200 of FIGS. 2A-2C. The DC surge protection device 300 is configured for plug-in to an electrical board, such as a motherboard. The motherboard may be capable of receiving a plurality of DC surge protection devices 300 (e.g., eight devices) such that a number of different electrical systems or equipment may be protected from surges via one motherboard accommodating a number of different DC surge protection devices 300. The motherboard may include one or more inductors corresponding to each DC surge protection device 300 to be received in order to form a surge protection circuit the same or similar as previously described for FIGS. 1A-1D. Thus, the DC surge protection device 300 may not include an inductor contained therein, but rather interfaces with the one or more inductors as part of a power path located on the motherboard via the first conductor 202 and third conductor 204 of the DC surge protection circuit board 200. In one embodiment, if the surge level is determined to be higher than the rated surge level of a given DC surge protection device 300, the DC surge protection device 300 may be automatically disconnected from the power path on the motherboard.

The DC surge protection device 300 has a housing or enclosure 301 containing a cavity therein. In one embodiment, the housing or enclosure 301 may have dimensions of 92 mm×42.4 mm×0.28 mm. The DC surge protection circuit board 200 (see FIGS. 2A-2C) is configured for placement in the cavity such that only the electrical conductors (202, 203, 204, 205) extend beyond the housing or enclosure 301. Thus, the sensitive surge protection circuitry of the DC surge protection circuit board 200 is safely contained within the housing or enclosure 301 and away from a user or surrounding environmental conditions. An indicator opening 310 in a top surface of the housing or enclosure 301 provides visual access within the cavity of the housing or enclosure 301, for example to one or more LEDs (e.g., green/red) or other element coupled with the DC surge protection circuit board 200, for notifying a user when a failure of one or more surge protection elements has occurred.

The housing or enclosure 301 may be manufactured in two parts, including a base portion 302 that snaps together with a remaining portion of the housing or enclosure 301 to form the exterior of the DC surge protection device 300. The base portion 302 includes four opening, one for each of the electrical conductors (202, 203, 204, 205) to permit their extension from within the cavity to the exterior of the housing or enclosure 301. A plurality of openings 320 are also disposed along one or more sides of the housing or enclosure 301 for mating with corresponding protrusions of the base portion 302. When the protrusions of the base portion 302 are received by the openings 320, the base portion 302 is thus locked in a stable position. The base portion 302 may therefore be easily removed and/or replaced in order to provide access to the DC surge protection circuit board 200 (see FIGS. 2A-2C) positioned within the cavity of the housing or enclosure 301, for example, in the case of a failure indicated to a user via the indicator opening 310.

Figure 4A:
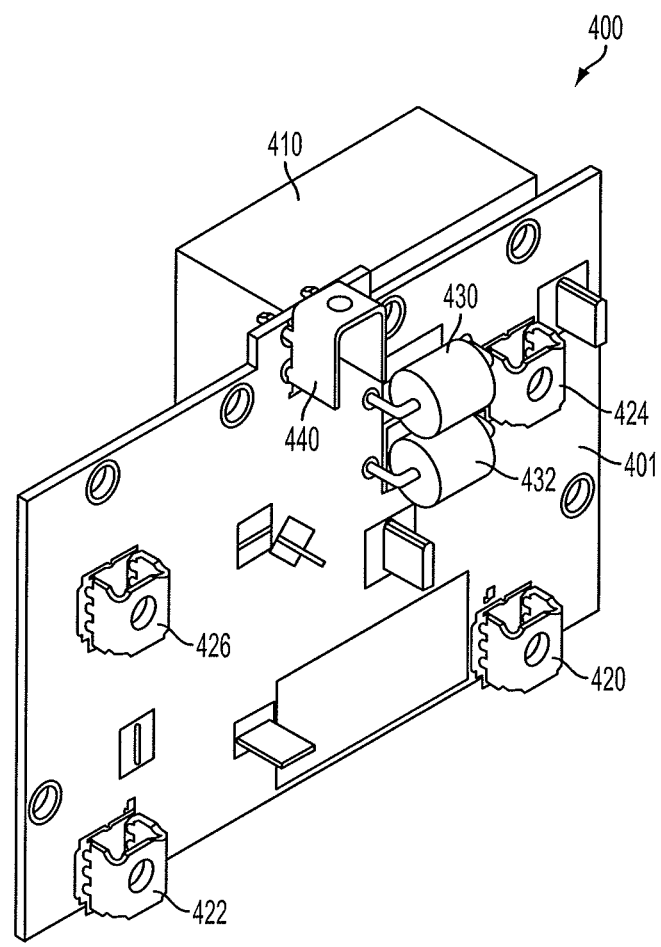
FIG. 4A is a perspective view of a DC surge protection circuit board configured for mounting to a frame according to an embodiment of the invention.
Figure 4C:
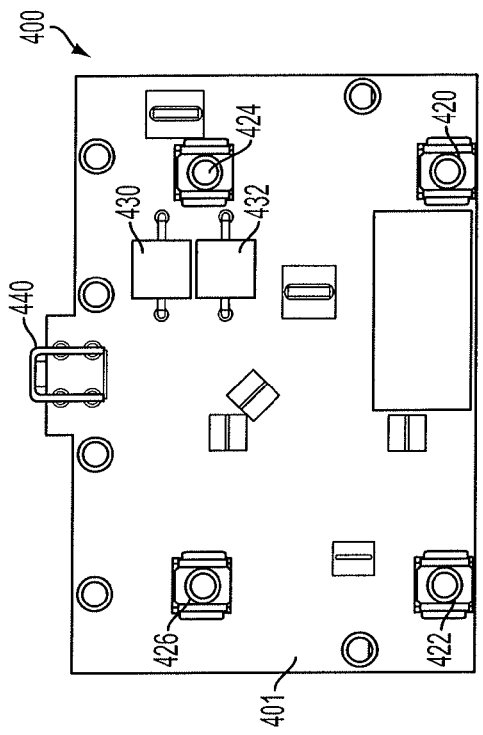
FIG. 4C is a rear view of the DC surge protection circuit board of FIG. 4A configured for mounting to a frame according to an embodiment of the invention.
Figure 4B:
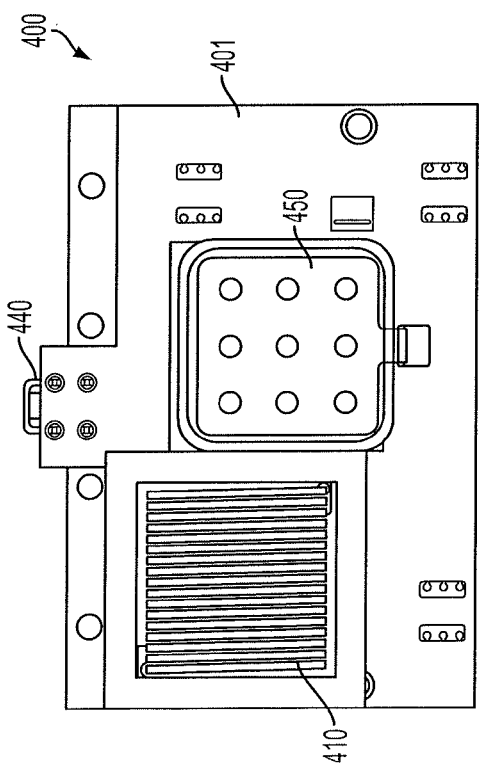
FIG. 4B is a front view of the DC surge protection circuit board of FIG. 4A configured for mounting to a frame according to an embodiment of the invention.
Figure 4D:
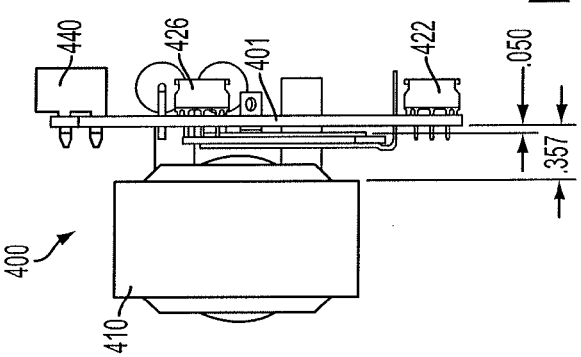
FIG. 4D is a side view of the DC surge protection circuit board of FIG. 4A configured for mounting to a frame according to an embodiment of the invention.
Figure 5:
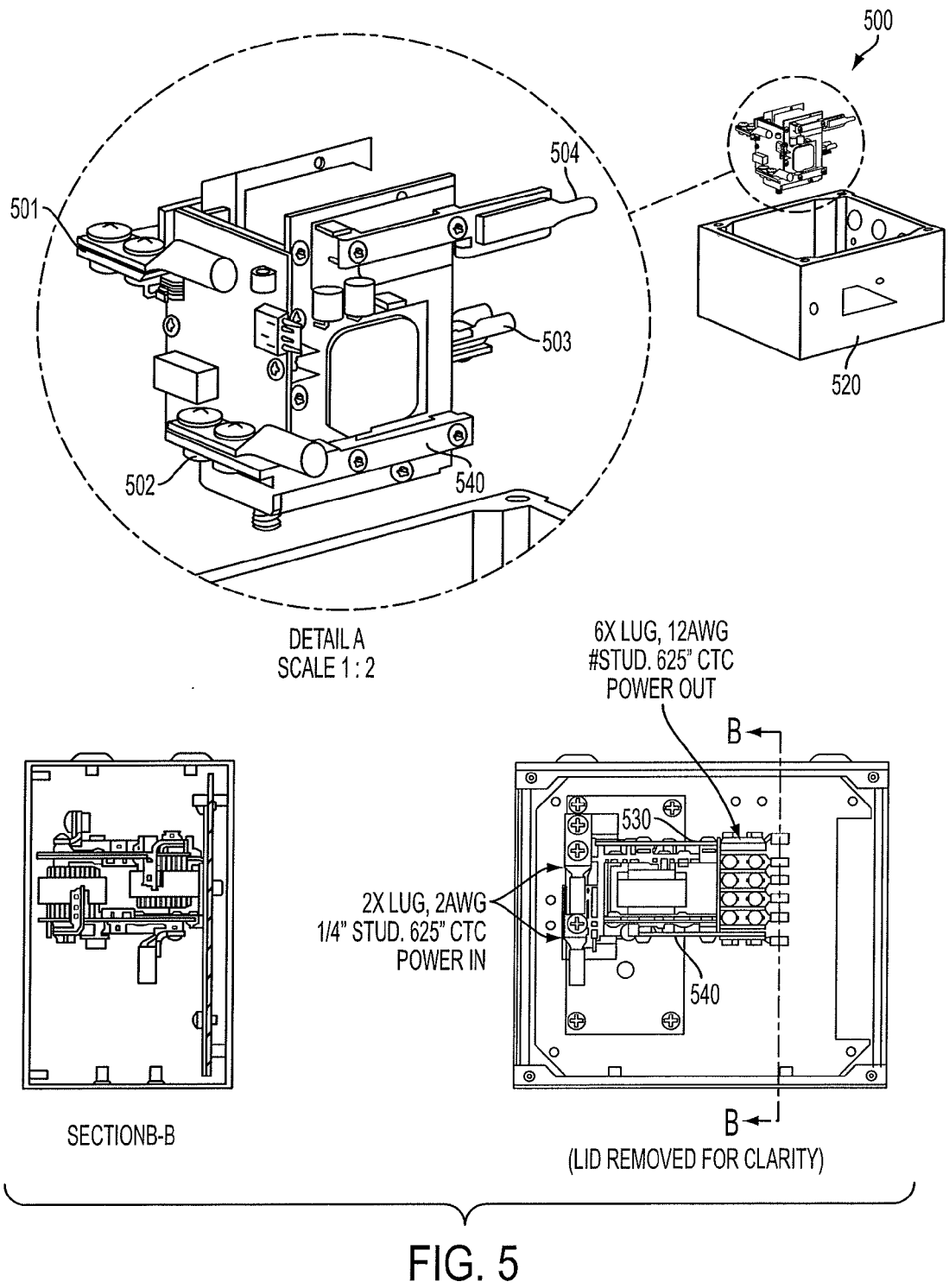
FIG. 5 is a plurality of views of a frame mounted with the DC surge protection circuit board of FIG. 4A mounted thereto according to an embodiment of the invention.

Referring to FIGS. 4A-5, various views are shown of a DC surge protection circuit board 400 configured for mounting to a frame. FIG. 4A is a perspective view of the DC surge protection circuit board 400 displaying a plurality of electrical components mounted thereto. A printed circuit board 401 having a front surface and a rear surface provides a stable unit for the mounting of the plurality of electrical components and includes the conductive pathways for their electrical connection to form a DC surge protection circuit. The DC surge protection circuit may be the same or similar to any of the DC surge protection circuits (100, 130, 160, 190) previously described for FIGS. 1A-1D. For example, the DC surge protection circuit may be configured for a nominal operating voltage of 48 Vdc, a maximum continuous operating voltage of 60 Vdc, a diode turn-on voltage of 67 V, leakage current at 30 uA, a nominal discharge surge current of 20 kA (multiple hits), a maximum discharge surge current of 30 kA, a voltage protection level of less than 100 V, a response time of less than 1 ns and both supply-to-ground and return-to-ground protection modes.

Screw mount terminals (420, 422, 424, 426) coupled with the rear surface of the printed circuit board 401 provide a mounting means for attaching the DC surge protection circuit board 400 to a frame. The screw mount terminals (420, 422, 424, 426) also provide a conductive node for interfacing various surge protection circuitry of the DC surge protection circuit board 400 with the frame when mounted. In one embodiment, the screw mount terminals (422, 426) are electrically tied together and act as a power input connection while the screw mount terminals (420, 424) are electrically tied together and act as a power output connection. The diodes (430, 432) are also mounted to the rear surface of the printed circuit board 401 and are electrically connected in parallel with one another and between the power input connection (e.g., screw mount terminals 422, 426) and the power output connection (e.g., screw mount terminals 420, 424). A screw terminal keystone 440 is mounted to the rear surface of the printed circuit board 401 near a perimeter edge of the printed circuit board 401 for providing a status or alarm notification connection. A status or alarm circuit on a separate printed circuit board 401 may thus interface with the screw terminal keystone to receive a notification signal when one or more components of the DC surge protection circuit board 400 have failed. In an alternative embodiment, different or no status notification or alarm circuitry may be provided in the DC surge protection circuit board 400.

FIG. 4B shows front view of the DC surge protection circuit board 400 and includes an inductor 410 mounted to the front surface of the printed circuit board 401. A first MOV 450 is also mounted to the front surface and near the center of the printed circuit board 401. FIG. 4C shows rear view of the DC surge protection circuit board 400 and FIG. 4D shows a side view of the DC surge protection circuit board 400 for demonstrating the positioning and/or orientation of the various electrical components. By incorporating the inductor 410 onto the DC surge protection circuit board 400, a frame having an input power source connection, a return source connection, an equipment power connection and an equipment return connection may directly attach to the DC surge protection circuit board 400 without requiring the addition of any other interfacing components.

FIG. 5 shows such one example of such a frame 500 with two DC surge protection circuit boards 400 connected thereto. The frame 500 has an input source connection 501 (e.g., −48 Vdc), a return source connection 502, an equipment connection 503 (e.g., −48 Vdc) and an equipment return connection 504. A first DC surge protection circuit board 530 (e.g., a DC surge protection circuit board 400 of FIG. 4A-4D) may electrically connect to the input source connection 501 and the equipment connection 503 via one or more screw mount terminals (e.g., screw mount terminals 422, 426 may connect to the input source connection 501 while screw mount terminals 420, 424 may connect to the equipment connection 503) while a second DC surge protection circuit board 540 (e.g., a DC surge protection circuit board 400 of FIG. 4A-4D) may electrically connect to the return source connection 502 and the equipment return connection 504 via one or more screw mount terminals (e.g., screw mount terminals 422, 426 may connect to the return source connection 502 while screw mount terminals 420, 424 may connect to the equipment return connection 504). An isolating enclosure or container 520 may receive all or some of the frame 500 for holding or keeping the frame 500 within a controlled environment for safety or other operational purposes.

Figure 6B:
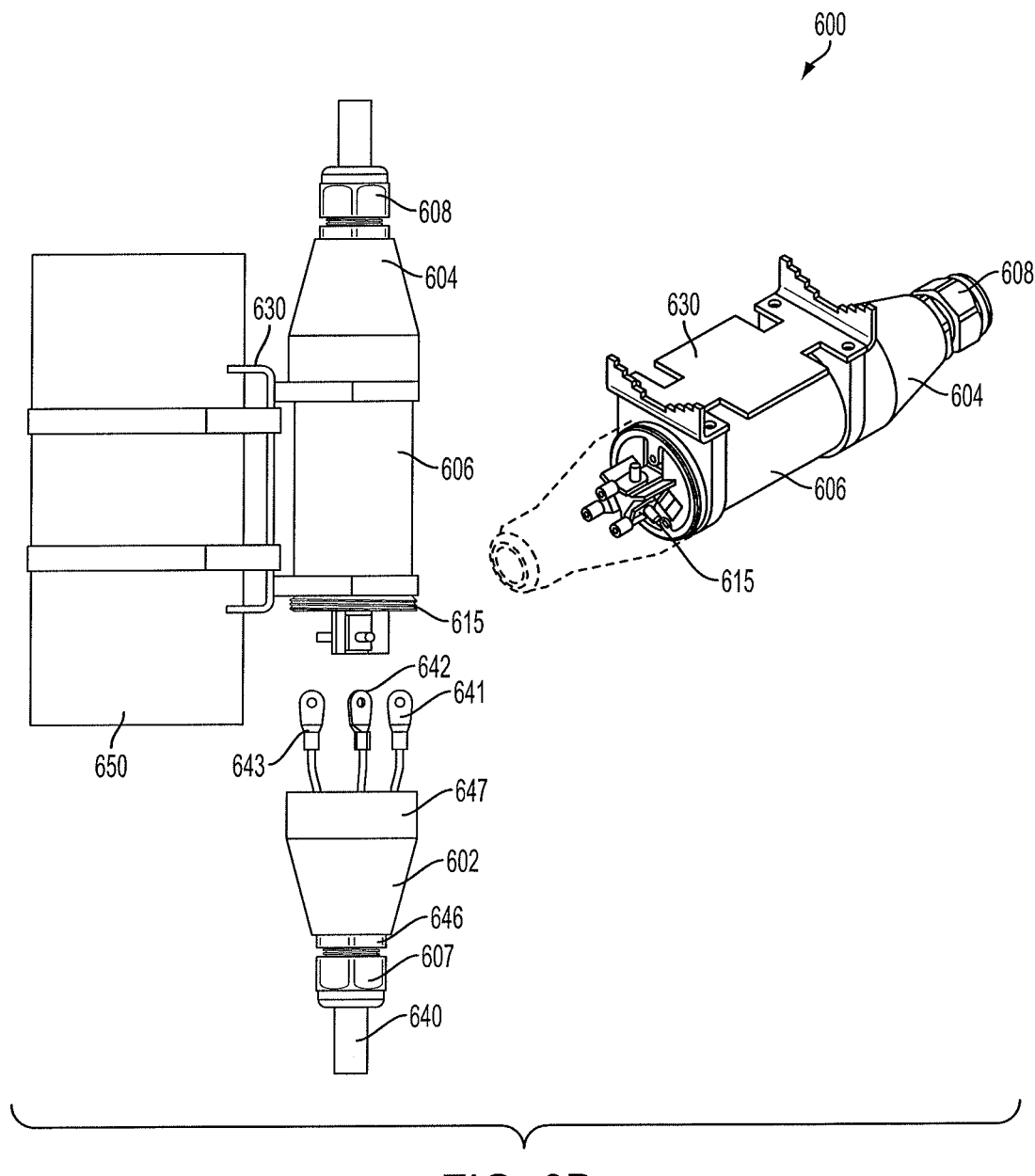
FIG. 6B is a plurality of views showing an interior connection of one end of the circular in-line cable protector of FIG. 6A for providing DC surge protection according to an embodiment of the invention.
Figure 6C:
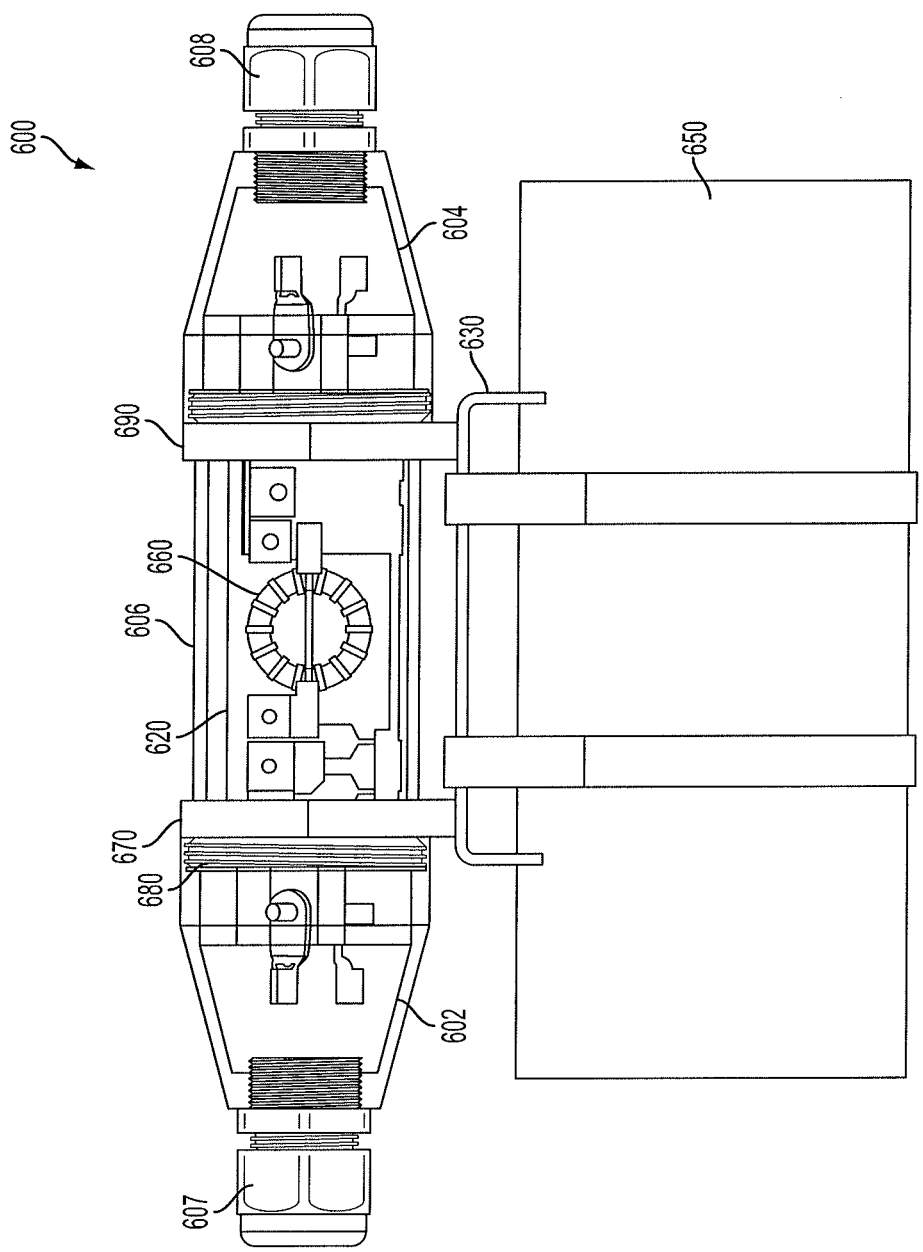
FIG. 6C is a side view of the circular in-line cable protector of FIG. 6A mounted to a stabilizing member for providing DC surge protection according to an embodiment of the invention.

Referring to FIGS. 6A-6C, various views of a cable protector 600 for providing DC surge protection are shown. The cable protector 600 may be a circular in-line cable protector configured to provide surge protection in an easily connectable device in-line with the transmission pathway of a user's system. The cable protector 600 includes a first end portion 602, a second end portion 604 and a middle portion 606. The middle portion 606 defines a cavity 620 therein for containing a plurality of electrical components. The plurality of electrical components make up a DC surge protection circuit that may be the same or similar as previously described for FIGS. 1A-1D. For example, the DC surge protection circuit may be configured for a nominal operating voltage of 48 Vdc, a maximum continuous operating voltage of 60 Vdc, a leakage current of 5 mA, a nominal discharge surge current of 20 kA, a maximum discharge surge current of 30 kA, a voltage protection level of less than 100 Vdc, a response time of less than 1 ns and a temperature range of −40 degrees C. to 85 degrees C. The plurality of electrical components may be mounted directly to a surface of the cavity 620 of the cable protector 600 or may be coupled with a printed circuit board that is fastened or otherwise contained within the cavity 620. In one embodiment, multiple DC surge protection circuits may be included within the cavity 620 of the cable protector 600, each DC surge protection circuit incorporated on its own printed circuit board.

The middle portion 606 has a first connection portion 615 and a second connection portion 616. The first and second connection portions (615, 616) each include a first conductive element 610 (e.g., a ground conductive element), a second conductive element 612 (e.g., a power conductive element, such as for −48 Vdc power) and a third conductive element 614 (e.g., a return conductive element). The conductive elements (610, 612, 614) allow a signal present on each of the respective conductive elements (610, 612, 614) to pass from an area outside the middle portion 606 to within the cavity 620 of the middle portion 606. Inside the cavity 620, the conductive elements (610, 612, 614) electrically interface with one or more of the plurality of electrical components contained therein for DC surge protection purposes. Moreover, a first strain relief 607 is coupled to (e.g., screwed onto) a portion of the first end portion 602 and a second strain relief 608 is coupled (e.g., screwed onto) a portion of the second end portion 604 for providing tension or strain relief to one or more wires that are connected through the first and second end portions (602, 604) to the first and second connection portions (615, 616) of the middle portion 606.

FIG. 6B shows an interior view of a connection of a cable 640 to the first connection portion 615 of the middle portion 606. The cable 640 has three connection terminals (641, 642, 643) corresponding to the three conductive elements (610, 612, 614) of the first connection portion 615. The first end portion 602 has a first opening 646 at one end for receiving the cable 640 and a second opening 647 opposite the first opening 646 for coupling with the middle portion 606. Thus, the connection terminals (641, 642, 643) of the cable 640 are contained within the first end portion 602 and safely isolated from the surrounding environment when connected to the conductive elements (610, 612, 614) of the first connection portion 615. The first strain relief 607 surrounds the cable 640 and fastens to the first end portion 602. In addition, a connecting bracket 630 is shown mounted to the middle portion 606 of the cable protector 600 for facilitating a connection to a stabilizing member 650, as discussed in greater detail herein.

FIG. 6C. shows a side view of the cable protector 600 fastened to the stabilizing member 650 via the connecting bracket 630. The stabilizing member 650 may be part of a frame of a user's hardware and allows the cable protector 600 to be safely clamped or otherwise secured in a predetermined location or orientation such that the cable protector 600 is protected from undesirable movement or jostling when the cable 640 (see FIG. 6B) changes its position. Since the cable protector 600 may include a variety of electrical components contained therein, minimizing movement of the cable protector 600 when any connected cables are shifted may be desirable. For example, disposed within the cavity 620 of the middle portion 606, electrical components including an inductor 660, diodes (670, 680) and a first MOV 690 are shown. Additional or fewer electrical components for providing DC surge protection may be utilized in an alternative embodiment.

Although FIGS. 1A-1D disclose particular circuit configurations using particular circuit components, other possible configurations or components may be utilized in an alternative embodiment. Similarly, while FIGS. 2A-6C describe particular embodiments or physical configurations for utilizing a DC surge protection circuit, any of a variety of other physical enclosures, mounting methods, or other packaging configurations may be utilized in an alternative embodiment. The exact configurations or components shown need not be utilized in certain configurations. Parts may be replaced, removed or added and the placement or configuration of such parts may be modified from the precise positioning described in the above embodiments.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A DC surge protection circuit comprising:
   a power input node for receiving an input signal, the input signal being either a surge signal or a non-surge signal;
   a power output node for outputting the non-surge signal;
   a first inductor electrically connected to the input node and the output node for permitting the non-surge signal to flow substantially unimpeded from the power input node to the power output node;
   at least one diode electrically connected between the power output node and a ground node for diverting at least a first portion of the surge signal to the ground node;
   a first metal oxide varistor electrically connected between the power input node and the ground node and in parallel with the at least one diode, the first metal oxide varistor being configured to divert at least a second portion of the surge signal after the at least one diode diverts the at least the first portion of the surge signal;
   a surge protection switch electrically connected between the at least one diode and the ground node, the surge protection switch having a current state of either an open state or a closed state; and
   an auxiliary switch electrically connected to the ground node, the auxiliary switch having a current state of either an open state or a closed state, wherein the current state of the auxiliary switch is based on the current state of the surge protection switch.

2. The DC surge protection circuit of claim 1 further comprising:
   a resistor electrically connected between the auxiliary switch and a status node, the status node being configured to propagate a notification signal for notifying a user when at least one of the first inductor or the at least one diode has failed.

3. The DC surge protection circuit of claim 2 further comprising:

a second inductor electrically connected between the first inductor and the power output node to form an intermediate node between the first inductor and the second inductor.

4. The DC surge protection circuit of claim 3 further comprising:
a gas tube electrically connected in parallel with the first metal oxide varistor and the at least one diode; and
a second metal oxide varistor electrically connected to the intermediate node and electrically connected in series with the gas tube.

5. The DC surge protection circuit of claim 4 wherein the at least one diode is a bi-directional diode.

6. The DC surge protection circuit of claim 4 further comprising:
an enclosure defining a cavity therein; and
a printed circuit board disposed at least partially within the cavity of the enclosure, the printed circuit board coupled with the at least one diode, the gas tube, the first metal oxide varistor and the second metal oxide varistor, wherein the printed circuit board is configured to electrically connect to a motherboard.

7. The DC surge protection circuit of claim 4 further comprising:
a first screw mount terminal electrically connected to at least the power input node;
a second screw mount terminal electrically connected to at least the power output node;
a third screw mount terminal electrically connected to at least the ground node; and
a fourth screw mount terminal electrically connected to at least the status node, wherein each of the first screw mount terminal, the second screw mount terminal, the third screw mount terminal, and the fourth screw mount terminal are configured to couple with a frame.

8. The DC surge protection circuit of claim 3 further comprising:
an enclosure defining a cavity therein; and
a printed circuit board disposed at least partially within the cavity of the enclosure, the printed circuit board coupled with the at least one diode and the first metal oxide varistor, wherein the printed circuit board is configured to connect to a plurality of connection terminals of a cable for providing in-line DC surge protection of the cable.

9. A DC surge protection circuit comprising:
a power input node for receiving an input signal, the input signal being either a surge signal or a non-surge signal;
a power output node electrically for outputting the non-surge signal;
at least one inductor electrically connected to the input node and the output node for permitting the non-surge signal to flow substantially unimpeded from the power input node to the power output node;
at least one diode electrically connected between the power output node and a ground node, the at least one diode being configured to divert at least a first portion of the surge signal to the ground node;
a first metal oxide varistor electrically connected between the power input node and the ground node and in parallel with the at least one diode, the first metal oxide varistor being configured to divert at least a second portion of the surge signal after the at least one diode diverts the at least the first portion of the surge signal;
an enclosure defining a cavity therein;
a printed circuit board disposed at least partially within the cavity of the enclosure, the printed circuit board coupled with the at least one diode and the first metal oxide varistor, wherein the printed circuit board is configured to connect to a plurality of connection terminals of a cable for providing in-line DC surge protection of the cable; and
a surge protection switch electrically connected between the at least one diode and the ground node.

10. The DC surge protection circuit of claim 9, wherein the surge protection switch has a current state of either an open state or a closed state, the DC surge protection circuit further comprising:
an auxiliary switch electrically connected to the ground node, the auxiliary switch having a current state of either an open state or a closed state, wherein the current state of the auxiliary switch is based on the current state of the surge protection switch; and
a resistor electrically connected between the auxiliary switch and a status node, the status node configured to propagate a notification signal for notifying a user when at least one of the at least one inductor or the at least one diode has failed.

11. The DC surge protection circuit of claim 9 wherein the at least one diode includes a first bi-directional diode and a second bi-directional diode, the bi-directional diode being connected in parallel with the first bi-directional diode, wherein each of the first bi-directional diode and the second bi-directional diode is electrically connected to the first metal oxide varistor, the surge protection switch and the power output node.

12. A DC surge protection circuit comprising:
a power input node for receiving an input signal, the input signal being either a surge signal or a non-surge signal;
a power output node for outputting the non-surge signal;
a cable protector including a first end portion, a second end portion and a middle portion between the first end portion and the second end portion, the middle portion having a cavity therein;
a first inductor positioned within the cavity and electrically connected to the input node and the output node for permitting a non-surge signal to flow substantially unimpeded from the power input node to the power output node;
a second inductor positioned within the cavity and electrically connected between the first inductor and the power output node to form an intermediate node between the first inductor and the second inductor;
at least one diode positioned within the cavity and electrically connected between the power output node and a ground node for diverting at least a first portion of a surge signal to the ground node;
a first metal oxide varistor positioned within the cavity and electrically connected between the power input node and the ground node and in parallel with the at least one diode, wherein the first metal oxide varistor diverts at least a second portion of the surge signal to the ground node after the at least one diode diverts the at least the first portion of the surge signal; and
a gas tube positioned within the cavity and electrically connected to the intermediate node and the ground node, wherein the gas tube is connect in parallel with the first metal oxide varistor and the at least one diode.

13. The DC surge protection circuit of claim 12 wherein the at least one diode is a bi-directional diode.

14. The DC surge protection circuit of claim 12 further comprising:

a printed circuit board disposed at least partially within the cavity, the printed circuit board coupled with the at least one diode, the gas tube and the first metal oxide varistor.

* * * * *